Nov. 18, 1952  C. J. WALKER  2,618,431
CONTROL SYSTEM FOR GAS TURBINE AIR COMPRESSOR PLANTS
Filed July 29, 1949
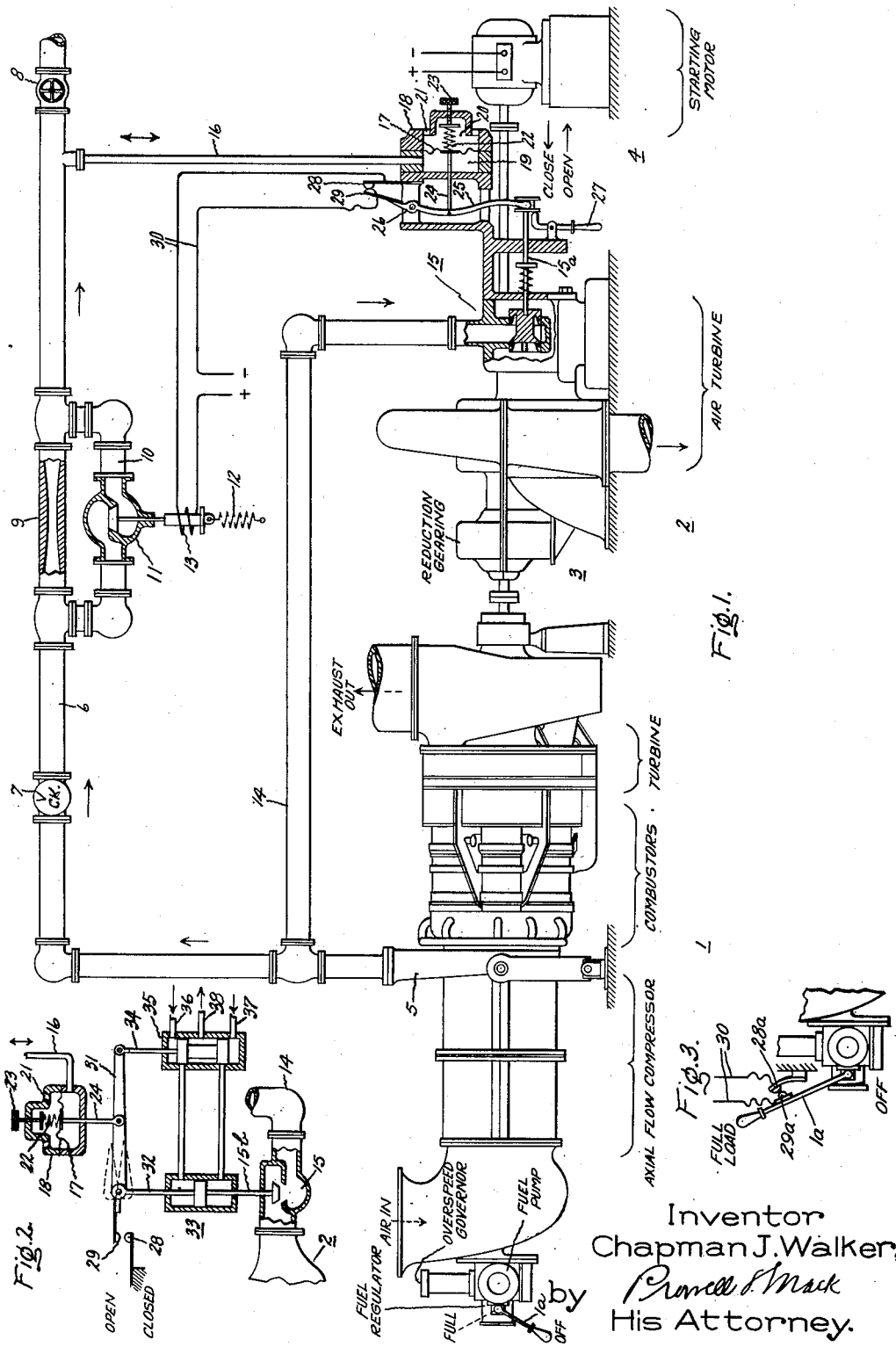
Inventor
Chapman J. Walker,
by
His Attorney.

Patented Nov. 18, 1952

2,618,431

UNITED STATES PATENT OFFICE 2,618,431

CONTROL SYSTEM FOR GAS TURBINE AIR COMPRESSOR PLANTS

Chapman J. Walker, Schenectady, N. Y., assignor to General Electric Company, a corporation of New York Application July 29, 1949, Serial No. 107,614

3 Claims. (Cl. 230—115)

1

This invention relates to prime mover powerplants, especially gas turbines of the simple open cycle type, particularly to such a powerplant adapted for furnishing its useful power output in the form of compressed air for various industrial uses, as for instance supplying the "shop air" system in an industrial plant. The invention specifically lies in the arrangement of such a compressed air plant including control means for regulating the plant in order to maintain a constant discharge pressure while permitting the prime mover to operate at constant speed within the stable operating limits of the air compressor.

The multi-stage axial flow type of compressor has appeared to show the best promise of maximum thermodynamic efficiency in compressing air to pressure levels on the order of 100 lbs. per square inch. Numerous attempts have been made, because of the attractive efficiency of this type of compressor, to apply it to such industrial uses as furnishing air for blast furnace operation where comparatively large quantities of air are required at moderate pressures. The problem of adapting this type of compressor to such uses is complicated by the fact that the axial flow compressor inherently has a rather limited stable operating range. In other words, at a given speed the degree of variation in the quantity of air drawn from the compressor at that speed is limited, primarily by the fact that the phenomenon known as "pulsation" or "surging" occurs if the quantity flow is decreased more than perhaps 10% below the maximum capacity flow. In an application where the speed of the compressor may be varied as the capacity changes, it is not too difficult to keep the compressor within its stable range. However, in an application such as the one specifically described hereinafter, it is important that the discharge pressure remain quite accurately at a preselected value, which of course means that the compressor must operate at a substantially fixed speed. This makes necessary some special arrangement for permitting the axial flow compressor to operate within its stable range of operation while holding constant discharge pressure for a widely varying range of discharge flow rates.

Accordingly, an object of the present invention is to provide an improved compressor plant for generating compressed air including a constant speed turbine type prime mover and an axial flow compressor with special provision for regulating the plant so that the compressor remains within its stable range of operation, the air delivery pressure remains constant, while an extreme range of flow rates is permitted, varying from zero to the maximum which the compressor and prime mover are capable of producing.

Another object is to provide a compressed air generating plant of the type described which is particularly suitable for use with turbine type prime movers, specifically a gas turbine powerplant.

A further object is to provide a regulating system for a plant of the type described, including means for automatically limiting the maximum flow which may be taken from the compressor, without exceeding the same operating limits of the prime mover employed.

A still further object is to provide a plant of the type described which is comparatively low in first cost, reliable in operation, and well adapted for generating compressed air in industrial plants where the supply of electrical energy available for driving compressors by electric motors is limited.

Other objects and advantages will be apparent from the following description taken in connection with the accompanying drawing, in which Fig. 1 is a diagrammatic representation of a compressed air generating plant in accordance with the invention, certain important components being shown in section, Fig. 2 is an alternate arrangement for one sub-combination of the regulating system disclosed, and Fig. 3 is an alternate arrangement for another sub-combination.

Referring now more particularly to Fig. 1, the invention is disclosed as applied to a gas turbine powerplant indicated generally at 1, comprising an axial flow compressor, a combustion system, and a gas turbine arranged in axially aligned relation, with the turbine driving the compressor. This powerplant is of the well-known "open" cycle type in which atmospheric air is taken into the compressor and the hot exhaust gas from the turbine is discharged to atmosphere, with no additional heat exchangers or other major auxiliaries incorporated in the cycle. Connected to the turbine-compressor rotor at the discharge end of the gas turbine powerplant is an air turbine indicated generally at 2 in Fig. 1. This may conveniently be a standard steam turbine, for instance a comparatively small two-stage mechanical drive steam turbine such as those used for refrigeration compressors, ventilating blowers, boiler feed pumps, etc. The air turbine is connected to the gas turbine rotor through a suitable reduction gear indicated generally at 3. Connected to the right-hand end of the air turbine shaft is a suitable starting motor, illustrated in the drawing as being an ordinary electric motor connected to a suitable power supply.

The specific details of construction of the gas turbine are not necessary to a disclosure of the present invention; but it may be noted that the powerplant shown in the drawing is that disclosed in the application of Alan Howard et al., Serial No. 754,002, filed June 11, 1947.

At the compressor inlet end of the gas turbine powerplant are arranged various auxiliary elements for the powerplant, including an emergency overspeed governor for cutting off the supply of fuel to the combustion system in the event the primary fuel regulating devices fail, a fuel pump of any suitable type, and an automatic regulator for controlling the discharge of oil from the pump to the combustion system. The details of this regulator are not disclosed here because not material to the present invention; however, it may be noted that the regulator may be generally similar to those shown in the application of M. A. Edwards et al., Serial No. 605,960, filed July 19, 1945, also the application of N. E. Starkey et al., Serial No. 84,416, filed March 30, 1949. The fuel regulators of these copending applications are enormously complicated combinations of various elements for sensing different operating conditions of the powerplant and regulating the fuel supply to the combustion system in accordance with the integrated effect of rotational speed, temperature level at which the powerplant is operating, ambient atmospheric temperature and/or pressure, etc. For diagrammatically representing in Fig. 1 the range of fuel supply rates over which the powerplant operates, a manual operating handle is shown at 1a, having an "off" position and a "full load" position. This may be considered a manual throttle lever for regulating the fuel flow according to a desired schedule in starting the powerplant. It will be understood that ordinarily the automatic fuel regulating device controls the fuel supply so as to keep the rotational speed of the powerplant substantially constant.

The present invention resides particularly in the manner in which the air turbine is coordinated with the gas turbine powerplant and the regulating mechanism by which the air delivery pressure is maintained constant regardless of changes in the volume rate of flow and the maximum obtainable air delivery is determined.

As will be apparent from Fig. 1, the axial flow compressor is provided with a manifold 5 for extracting from the compressor discharge the air which represents the "useful output" of the powerplant. The "useful" portion of this air is discharged through a conduit 6 containing a check valve 7, a manually actuated shut-off valve 8, and a Venturi section 9, the purpose of which will be described more particularly hereinafter. In parallel with the venturi 9 is a bypass conduit 10 containing a shut-off valve 11 biased to wide open position by a tension spring 12 and moved to the closed position by a solenoid 13, as controlled by the regulating mechanism disclosed hereinafter.

In order to permit the axial flow compressor to operate at substantially constant speed, which means constant volume flow, in spite of variations in the amount of compressed air drawn from the discharge conduit 6, a variable amount of the air from manifold 5 is bled off through a conduit 14 and passed through the air turbine 2. It will be apparent that the air turbine serves to extract the energy of compression, which is returned to the shaft of the gas turbine powerplant through the reduction gearing 3. Thus the energy of the high pressure air which must be bled for control purposes is not wasted. It will be obvious that any power returned to the turbine-compressor rotor by the air turbine 2 decreases the amount of fuel which the automatic regulator must supply to the combustion system in order to maintain turbine-compressor rotor speed at the desired constant value. It will also be appreciated by those skilled in the art that the rotational speed of the axial flow compressor must be maintained constant in order that the delivery pressure of the air will remain constant at a desired value.

The quantity of air bled through conduit 14 is controlled by the air turbine throttle valve shown generally at 15. This is represented schematically as being a balanced valve of the well-known double seat type. The flow controlling member 15a is arranged to be positioned automatically by means responsive to the delivery pressure just ahead of the shut-off valve 8, this pressure being communicated by a pressure sensing conduit 16 to a suitable pressure responsive device shown in Fig. 1 as being a diaphragm 17 contained in a housing 18 defining a pressure chamber 19 at the left-hand side of the diaphragm and a second chamber 20 at the right-hand side of the diaphragm which is open freely to atmosphere by way of a plurality of ports 21. Contained within the chamber 20 is a compression spring 22 arranged to oppose the delivery pressure in chamber 19. In order to adjust the compression force exerted by spring 22, a manual handwheel 23 positions an axially movable abutment engaging the right-hand end of spring 22.

Connected to the central portion of the diaphragm 17 at the side opposite from the compression spring 22 is an actuating rod 24 connected to a lever 25 pivoted on a fulcrum 26. The other end of lever 25 is arranged to position the air control valve member 15a. For a purpose described hereinafter, a manual operating lever 27 is provided for positioning the flow control member 15a, as required during starting the powerplant.

Carried on the housing of the regulating mechanism is a stationary electrical contact 28, with which is cooperatively associated a movable contact 29 connected to move with the lever 25. As indicated in the drawing, the contacts 28, 29 are closed when the air turbine valve 15a is in the fully closed position. The electrical leads 30 connect the contacts 28, 29 with the solenoid 13 and a suitable source of power. It will be apparent therefore that the closing of the contacts 28, 29 when the air valve 15a is closed results in the bypass valve 11 being closed whenever the air control valve member 15a moves to its fully closed position.

In normal operation, the regulating mechanism holds the delivery pressure constant in the following manner. In the event the delivery pressure at valve 8 falls below the desired value, the pressure in chamber 19 drops and spring 22 acts on rod 24 to move lever 25 clockwise so as to position valve member 15a in the closing direction. This decreases the amount of air bled through conduit 14 so that the pressure in the discharge conduit 6 rises. This rise in pressure causes the diaphragm 17 to move slightly to the right, so that lever 25 pivots counterclockwise and the valve member 15a is moved to the right in the valve opening direction. This increases the amount of air bled through conduit 14, so that a stable condition is reached in which the delivery pressure is at the desired value. The delivery pressure which the regulating mechanism will hold may be adjusted by positioning the manual hand wheel 23. It will be apparent that increasing the compression force exerted by spring 22 will increase the delivery pressure which must be applied to the left-hand side of the diaphragm 17 in order to balance the spring force. Thus equilibrium will be reached at a higher delivery pressure.

This compressed air generating powerplant may be connected in parallel with other compressed air generators, all supplying air to a "shop air system" or other consumer. In such service the manual shut-off valve 8 may be left open all the time, since the check valve 7 insures that there will be no back flow through the axial flow compressor when the powerplant 1 is shut down. Thus the shop air pressure will continue to be exerted through the conduit 16 on the diaphragm 17 so that the air control valve member 15a is held in its right-hand wide-open position when the plant is shut down. Then when it is desired to generate air with the powerplant 1, the starting motor 4 may be energized to bring the gas turbine rotor up to the "firing speed" which may, for instance, be about 25% of full rated speed, whereupon the ignition system (not shown) is energized and combustion begins in the combustors. The gas turbine then begins to develop power and as the fuel supply is increased, by the manual handle 1a or equivalent automatic regulating devices, the amount of power increases until the gas turbine cycle is self-supporting. The starter motor 4 may now be deenergized and the fuel control mechanism actuated to bring the gas turbine speed up to its normal rated value, which may be on the order of 7500 R. P. M. The air delivery pressure is now sufficient to open the check valve 7. If the operation of the gas turbine powerplant 1 should result in raising the air delivery pressure above the desired normal value, the pressure responsive diaphragm 17 will actuate the air valve control member 15a in the manner described above to move the air turbine throttle valve towards open position until an equilibrium condition is reached with the air delivery pressure at its desired value and a certain portion of the air being diverted through the bleed conduit 14 and the air turbine 2. If now the demand for compressed air increases, the delivery pressure will tend to fall so that diaphragm 17 moves to the left to progressively close the air turbine throttle valve 15. At the maximum air discharge rate for which the gas turbine powerplant is designed, which is about 22,000 cubic feet per minute (free air at 14.7 lbs./sq. in. and 80° F.) for the specific plant described herein, the air turbine valve reaches its fully closed position and the electrical contacts 28, 29 close to energize the solenoid 13 and close the bypass valve 11. Thus when the maximum output condition is reached, the closing of valve 11 forces all the air to pass through the flow restricting venturi 9. This is designed to have a minimum cross section or "throat" area of such a size that sonic velocity flow occurs when the rate of flow through the venturi equals the maximum rate of delivery which the gas turbine powerplant can safely furnish. Thus when the bypass valve 11 closes, the venturi 9 serves to limit the useful air which the powerplant can supply to the consumer. Thus the gas turbine powerplant 1 is provided with an aerodynamic overload preventing arrangement, in addition to the overspeed governor and the other safety devices incorporated in the fuel regulator.

In the event this powerplant is not used in parallel with other compressed air generators, then when the plant is shut down, the delivery pressure will fall to zero and compression spring 22 will bias the air control member 15a to the fully closed position, with the contacts 28, 29 closed. Now in starting the powerplant, it is advisable to have the delivery valve 8 closed and the air control valve in wide open position so that any air under pressure generated during the starting cycle will flow back through the air turbine 2 and thereby decrease the net power which the starting motor needs to generate. For this reason the manual lever 27 is provided for holding the valve open against the bias of spring 22 during the starting cycle. After the powerplant is brought up to normal rated speed the shut-off valve 8 is opened and the manual handle 27 released so the discharge pressure comes under the control of the pressure responsive diaphragm 17.

It is to be noted that the electrical arrangement disclosed for actuating the bypass valve 11 is essentially responsive to the load output of the gas turbine powerplant. That is, contacts 28, 29 are normally open but close when the air control valve 15 is closed, which condition means that the gas turbine powerplant is operating at its maximum rated capacity. Thus the position of the air control valve member 15a is taken as a convenient signal indicating that the maximum load condition has been reached. It will be obvious that other equivalent signals may be employed as a measure of maximum load output. For instance, some component of the gas turbine fuel regulator, such as the fuel control lever 1a, may be provided with contacts, as shown at 28a, 29a in Fig. 3, which close to produce an electrical signal when the maximum permissible rate of fuel flow is attained.

Fig. 2 shows a schematic view of an alternate arrangement for the pressure responsive controlling means for the air turbine throttle valve. Here the pressure responsive diaphragm 17 actuates rod 24 to position a floating lever 31. One end of lever 31 is connected to a follow-up rod 32 projecting from the piston of a hydraulic motor indicated generally at 33, which is arranged to position the air throttle valve rod 15b. The other end of lever 31 is connected to the actuating stem 34 of a pilot valve contained within a housing 35 to which an operating liquid under pressure is supplied from a suitable source (not shown) through supply conduits 36, 37 and from which operating liquid is exhausted through a drain conduit 38. Hydraulic motor 33 and the pilot valve arrangement shown at 35 are of a type well known in the art and constitute a hydraulic amplifier for transforming the motion of the pressure responsive stem 24 into movements of the valve stem 15b.

The operation will be obvious to those skilled in the art. If the pressure signal in conduit 16 drops, the diaphragm 16 deflects downwardly, lever 31 pivots clockwise about the left-hand connection with the stem 32, and the pilot valve 34 admits operating liquid from the supply conduit 36 to the top of the piston in hydraulic motor 33. The result is that valve 15 is positioned in the closing direction, with the result that lever 31 pivots somewhat about its intermediate connection with spindle 24, in the counterclockwise direction, so that pilot valve stem 34 is caused to rise and shut off the supply of operating liquid from conduit 36. Conversely, upon an increase in pressure in the pressure sensing conduit 16, diaphragm 17 deflects upwardly and the hydraulic motor moves the valve 15 in the opening direction. Thus it will be seen that Fig. 2 represents a hydraulically amplified equivalent for the simple direct-acting mechanical arrangement shown in Fig. 1 for positioning the air turbine throttle valve. It will be obvious that many other equivalent mechanical, hydraulic, or electrical systems for positioning the air turbine valve may also be used.

In the specific representative powerplant described, the axial flow compressor consists of 15 stages, driven by a two-stage gas turbine. The total amount of useful air drawn from the manifold 5 may be on the order of 22,000 cubic feet per minute ("free air" at a pressure of 14.7 lbs./sq. in. gage and 80° F.), that is, about 25% of the total compressor air flow. The normal rotational speed of the compressor to maintain a delivery pressure of 100 lbs./sq. in. gage may be on the order of 7500 R. P. M. The firing speed of the gas turbine powerplant, at which combustion is initiated, may be on the order of 1500 R. P. M., and the idling speed, at which point the powerplant cycle becomes self-supporting at "no load," may be on the order of 4000 R. P. M. As indicated above, the automatic regulating devices provided for the fuel system insure that the rotational speed of the compressor in normal operation will not vary more than 4% from minimum load to maximum load. The useful air output of such a powerplant may vary from the stated maximum value of 22,000 cu. ft./min. to a minimum of zero flow. The corresponding rates of fuel flow are on the order of 3600 pounds per hour of "bunker C" fuel oil for maximum flow and 2600 pounds per hour for minimum flow. The gas turbine employed may be designed to develop a maximum of about 17,000 H. P., and the air turbine employed may be one designed to develop about 2500 H. P. For a power plant of such size, the electric starting motor would need to be on the order of 150 H. P. For a powerplant of the characteristics stated, the venturi 9 has a throat cross-section of 12 square inches, and the bypass valve 11 has a flow area of about 20 square inches.

It will be apparent to those skilled in the art that many other modifications may be made in compressed air generating powerplants incorporating the invention. For instance, the gas turbine powerplant might be replaced by any other suitable constant speed prime mover for driving the axial flow compressor. The gas turbine is particularly well adapted since it is essentially a constant speed machine. Also, the electric starter motor 4 may be dispensed with and the air turbine 2 used as the starter motor by supplying air at a suitable pressure from an external source to the air turbine. A small separate arc of nozzles may be incorporated in the air turbine for this purpose.

Thus, it will be apparent that many changes and modifications may be made, and it is desired to cover by the appended claims all such changes as fall within the true spirit and scope of the invention.

What I claim as new and desire to secure by Letters Patent of the United States, is:

1. In an air compressing plant including a prime mover having regulating means for maintaining substantially constant speed and driving a compressor, the combination of an air turbine with a rotor adapted to deliver power to the compressor shaft to decrease the net power required to drive the compressor and a throttle valve for regulating the flow of air to the air turbine, discharge conduit means for delivering air under pressure from the compressor to a consumer, flow limiting means in said conduit and including a Venturi section having a preselected minimum throat area to effect sonic velocity at flow rates corresponding to the maximum permissible output of the compressor at normal rated speed and discharge pressure, said flow limiting means also including a bypass conduit in parallel with said venturi and a normally open shut-off valve in said bypass, bleed conduit means for diverting a portion of the air to the air turbine throttle valve from the discharge conduit upstream from said venturi, means responsive to the pressure of air delivered to the consumer for positioning the air turbine throttle valve to maintain delivery pressure substantially constant, and servo-motor means with a control member positioned in accordance with the load output of the prime mover and adapted to close said bypass valve when the load output of the prime mover reaches its maximum permissible value.

2. In a gas compressing plant including a prime mover with regulating means for maintaining substantially constant speed and driving a compressor, the combination of a fluid pressure motor connected to deliver power to the compressor shaft to decrease the net power required to drive the compressor and a throttle valve for regulating the flow of air to the motor, discharge conduit means for delivering gas under pressure from the compressor to a consumer, flow limiting means in said conduit and including a section of restricted cross-section area adapted to effect sonic velocity at flow rates corresponding to the maximum permissible output of the compressor at normal rated speed and discharge pressure, said flow limiting means also including a bypass conduit in parallel with said restriction and a normally open shut-off valve in said bypass, bleed conduit means for diverting a portion of the gas to the fluid pressure motor from the discharge conduit upstream from said restriction, servo-motor means with a control member positioned in accordance with the pressure of gas delivered to the consumer and adapted to adjust the fluid pressure motor throttle valve to maintain delivery pressure at a preselected value, and second servo means with a control member positioned in accordance with the load output of the prime mover and adapted to close said bypass valve when the load output reaches its maximum permissible value.

3. In a gas compressing plant including a prime mover with regulating means for maintaining substantially constant speed and driving a compressor, the combination of fluid pressure motor means connected to deliver power to the compressor shaft and a throttle valve for regulating the flow of motive fluid to said motor, discharge conduit means for delivering gas under pressure from the compressor to a consumer, flow limiting means in said conduit and including a section of restricted area to effect sonic velocity flow at the maximum permissible output of the compressor at normal rated speed and discharge pressure, a bypass conduit in parallel with said flow restriction and containing a normally open shut-off valve, bleed conduit means for diverting a portion of the gas to said throttle valve from the discharge conduit upstream from said restricted section, servomotor means with a control member positioned in accordance with gas delivery pressure and adapted to regulate the throttle valve to hold delivery pressure constant, and servo means with a control member positioned in accordance with throttle valve position and adapted to close the bypass valve when the throttle valve reaches its fully closed position.

CHAPMAN J. WALKER.

REFERENCES CITED

The following references are of record in the file of this patent:

UNITED STATES PATENTS

| Number | Name | Date |
|---|---|---|
| 1,154,959 | Banner | Sept. 28, 1915 |
| 2,399,046 | Larrecq | Apr. 23, 1946 |

FOREIGN PATENTS

| Number | Country | Date |
|---|---|---|
| 531,997 | Great Britain | Jan. 15, 1941 |
| 601,964 | France | Dec. 16, 1925 |
| 620,239 | Germany | Sept. 26, 1935 |
| 667,222 | Germany | Nov. 7, 1938 |
| 691,578 | Germany | May 31, 1940 |